Patented Mar. 13, 1923.

1,448,010

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

ARTIFICIAL MAGNESIA SPINEL AND PROCESS OF MANUFACTURE.

No Drawing.    Application filed April 5, 1921.   Serial No. 458,641.

*To all whom it may concern:*

Be it known that I, FRANK J. TONE, a resident of Niagara Falls, Niagara County, New York, have invented a new and useful Improvement in Artificial Magnesia Spinel and Process of Manufacture, of which the following is a full, clear, and exact description.

The present invention relates to artificial magnesia spinel and a process of manufacturing it. Magnesia spinel, corresponding to the chemical formula $MgO, Al_2O_3$, contains 71.8% alumina and 28.2% magnesia. This mineral has a very high melting point and also a certain resistance to molten slags, which properties make it of value as a refractory. The natural deposits of this mineral, while well distributed, do not occur in sufficient quantities in any one locality so that a large tonnage of this material can be secured for commercial work. I have discovered that magnesia spinel may be produced artificially by means of the process described below.

The product obtained from this process is practically identical with the natural product both in chemical and in physical properties, and in addition, can be produced with a uniform composition in unlimited quantities. The artificial magnesia spinel product is a rock-like mass of a greenish or brown color consisting of masses of spinel crystals closely knitted to one another.

My process consists in fusing together, preferably in an electric furnace, magnesite or any suitable ore of magnesite containing a large percentage of magnesia, and bauxite or other suitable material which contains a large percentage of alumina. Any ordinary form of arc furnace with vertical electrodes depending into the furnace pot or chamber is suitable for carrying out this process. The charge mixture is fed into the furnace around the electrodes and as the finished product accumulates and builds up under the arc, the electrodes are raised to allow the finished product to form a pig or ingot of considerable size. After these raw materials have been thoroughly fused into a liquid state, the molten mass is allowed to cool and results in a pig of refractory material which is broken up for use.

In the preferred method of carrying out this invention, I fuse together in an electric furnace a mixture consisting of 64.7% of aluminous abrasive fines and 35.3% of a high grade calcined magnesite. The aluminous fines used contain approximately 92% alumina and is a by-product of the abrasive industry. The resultant product from this fusion is a very dense dark green rock-like mass which has the following chemical analysis:

| | |
|---|---|
| $SiO$ | .12 |
| $FeO$ | Trace. |
| $TiO_2$ | 1.78 |
| $Al_2O_3$ | 70.10 |
| $CaO$ | Trace. |
| $MgO$ | 28.00 |
| $C$ | .008 |

The following is a typical example of the manufacture of this material from low grade ores or raw materials. I melt in an electric furnace the following mixture: 1060 pounds of emery, 330 pounds magnesite and 110 pounds coke. The reducing agent, coke, in this mixture causes a certain amount of reduction of the iron oxide and silica content in the emery to metallic compounds which are easily separated from the solidified refractory products. The product from this fusion analyzes as follows:

| | |
|---|---|
| $SiO$ | 2.54 |
| $Fe_2O_3$ | .82 |
| $Al_2O_3$ | 72.54 |
| $CaO$ | 2.54 |
| $MgO$ | 21.57 |

I do not wish to limit myself to the exact raw materials mentioned above. I may use as a source of alumina any suitable material or ore containing a high percentage of alumina such as pure aluminum oxide, calcined or uncalcined bauxite, emery, clay, diaspore, alumite, aloxite, aluminous abrasive fines or other by-product from the abrasive industry. As a raw material for the magnesia content of the refractory product, I may use pure magnesium oxide, calcined or uncalcined magnesite or other suitable material containing a substantial percentage of magnesia.

By the term "ore," as herein used, is meant any mineral body, either natural or artificial, containing the respective oxides or oxygen compounds of magnesium or aluminum in substantial quantities.

I claim:
1. The process of making magnesia spinel comprising fusing a mixture containing magnesia and alumina at a temperature sufficient to form a rock-like closely knitted crystalline mass when cooled, and allowing the fused product to cool.

2. The process of making magnesia spinel comprising fusing a mixture containing magnesia, alumina and a reducing agent at a temperature sufficient to form a rock-like closely knitted crystalline mass when cooled, and allowing the fused product to cool.

3. The process of making magnesia spinel comprising fusing a mixture containing alumina and magnesite at a temperature sufficient to form a rock-like closely knitted crystalline mass when cooled, and allowing the fused product to cool 4. The process of making magnesia spinel comprising electrically fusing a mixture containing magnesia, alumina and a reducing agent at a temperature sufficient to form a rock-like closely knitted crystalline mass when cooled, and allowing the fused product to cool.

5. The process of making magnesia spinel, which consists in electrically smelting a mixture containing magnesia and alumina and a reducing agent at a temperature sufficient to fuse the ores and reduce a portion of the impurities in the ores to metallic form, allowing the fused product to cool, and separating the metallic impurities.

6. The process of making magnesia spinel comprising electrically fusing a mixture containing alumina ore and magnesite at a temperature sufficient to form a rock-like closely knitted crystalline mass when cooled, and allowing the fused product to cool.

7. As a new article of manufacture, a fused rock-like closely knitted crystalline mass consisting principally of artificial magnesia spinel.

8. As a new article of manufacture, a fused mass of substantially pure artificial magnesia spinel.

9. As a new article of manufacture, a rock-like closely knitted crystalline refractory product, consisting of artificial magnesia spinel.

In testimony whereof, I have hereunto set my hand.

FRANK J. TONE.